March 7, 1967     K. TASKER     3,307,432
VARIABLE RATIO GEAR MECHANISMS
Filed May 25, 1964     3 Sheets-Sheet 1

INVENTOR
Kenneth Tasker
By Watson, Cole, Grindle & Watson
ATTORNEYS

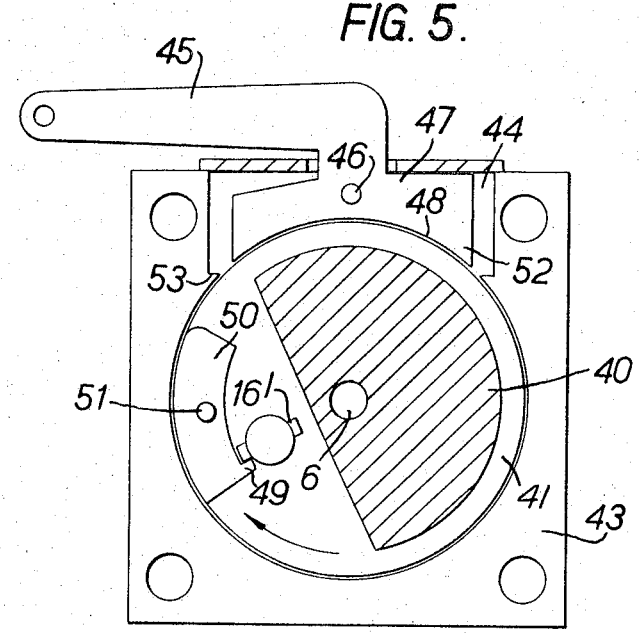
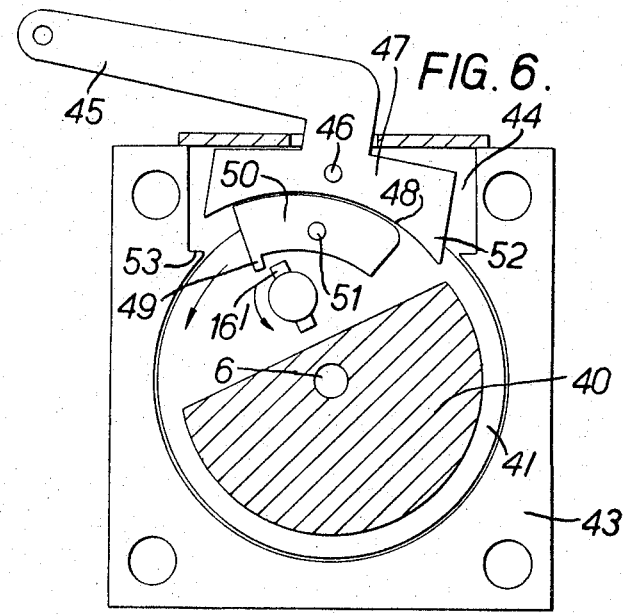

_United States Patent Office_ 3,307,432
Patented Mar. 7, 1967

3,307,432
VARIABLE RATIO GEAR MECHANISMS
Kenneth Tasker, London, England, assignor to Multiratio Drives Limited, Feltham, England, a company of Great Britain
Filed May 25, 1964, Ser. No. 369,985
4 Claims. (Cl. 74—770)

This invention relates to variable ratio gear mechanisms.

According to the invention we provide a variable ratio gear mechanism having a plurality of speed change units mounted in series on a common shaft, each unit comprising a gear mount rotatable on the shaft, a drive gear also rotatable on the shaft, a plurality of intermediate gears rotatably supported on the mount coupling the drive gear of the unit with the drive gear of the next unit in said series, and means to lock the intermediate gears against rotation with respect to the mount; said mechanism further comprising for each unit selector means for actuation alternatively to free the mount for rotation and simultaneously cause said locking means to lock the intermediate gears or to lock the mount against rotation and free the intermediate gears for rotation; an output gear mounted on the shaft and coupled to the intermediate gears of the last said unit in the series; and means to supply drive to the drive gear of the first unit in the series.

In order that the invention may be fully understood, a preferred embodiment thereof will now be described in detail with reference to the accompanying drawings, in which:

FIGURES 5 to 8 show the modes of operation of an alternative form of gear selection for the variable ratio gear mechanism shown in FIGURE 1.

Figure 1:
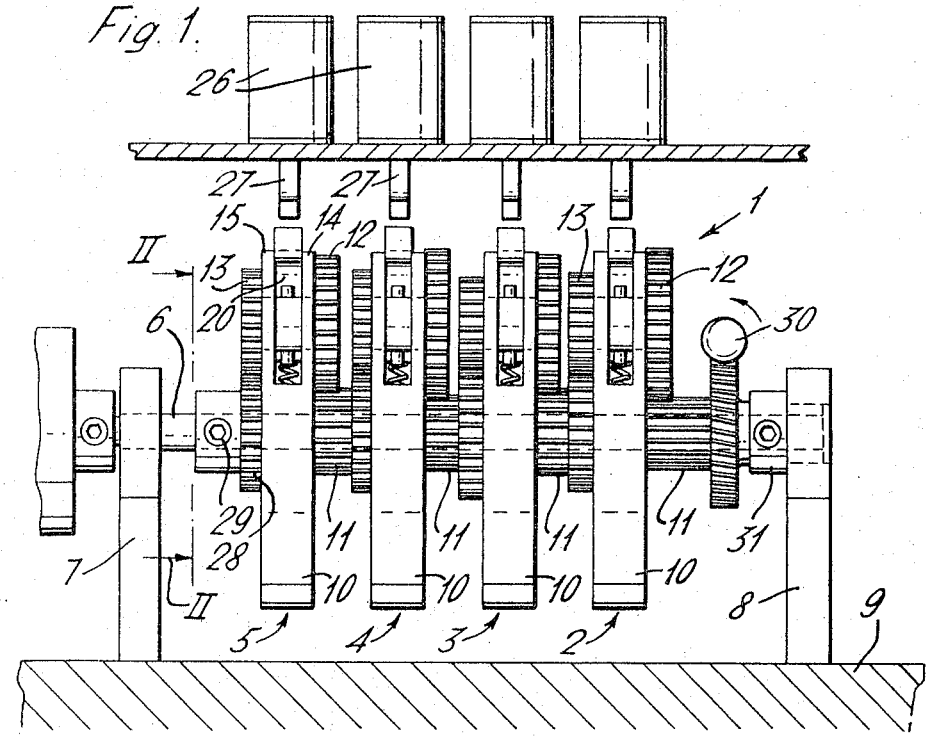
FIGURE 1 shows a front view of a variable ratio gear mechanism, having a series of speed change units.
Figure 2:
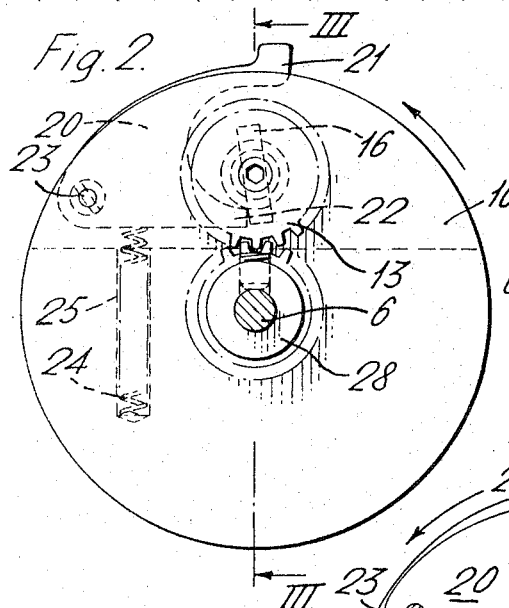
FIGURE 2 shows a side elevation of the last one of the series of speed change units of the mechanism shown in FIGURE 1.
Figure 3:
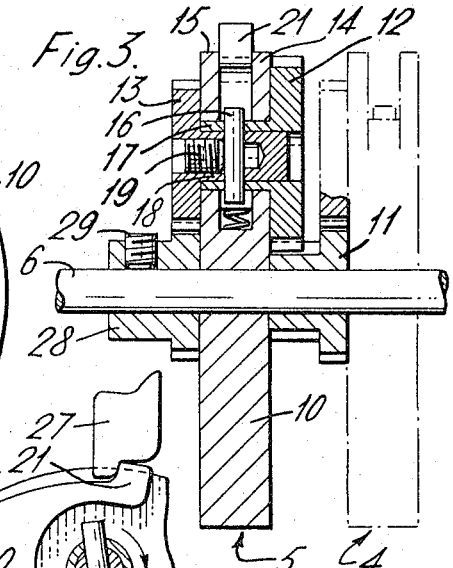
FIGURE 3 shows a cross-sectional view of the unit of FIGURE 2.
Figure 4:
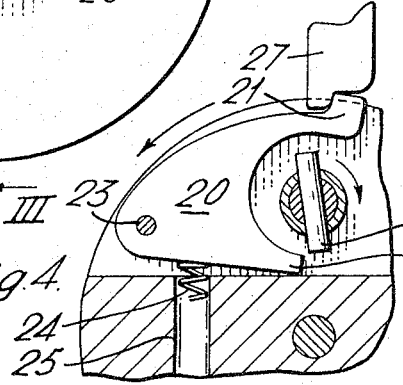
FIGURE 4 shows in cut-away section a part of the unit of FIGURE 2.

Referring to the drawings there is shown in FIGURE 1 a variable ratio gear mechanism 1 having four speed change units 2, 3, 4, 5 mounted in series on a common shaft 6 supported in end plates 7 and 8 secured to a base plate 9. Each unit comprises a disc-like gear mount 10 and drive gear 11 both rotatable on the shaft 6 and two intermediate gears 12 and 13 rotatable in cheeks 14 and 15 formed by a slot in the mount 10. Gear 12 is mounted on one side of cheek 14 and is coupled to the gear 13 mounted on the opposite side of cheek 15 by a pin 16 passing through aligned holes in hollow shafts 17 and 18 extending from the gears 12 and 13, respectively, the shaft 18 being received within the shaft 17. The holes in the shafts are of larger diameter than the pin 16, to facilitate entry of the latter which is held in place by a grub screw 19 in the hollow shaft 18. Locking means in the form of a lever 20 having upper and lower nose portions 21 and 22, respectively, is pivoted in the slot between the cheeks 14 and 15 by a pin 23 and urged upwardly by a spring 24 held within a bore 25 in the mount 10 to cause the nose portion 22 to engage the lower part of pin 16 as shown in dotted outline in FIGURE 2.

Above each speed change unit is a selector means 26 having an arm 27 movable to engage the upper nose portion 21 of the lever 20 of the respective unit and shaped so as to cause depression of that lever to release the intermediate gears for rotation with respect to the mount and to lock the latter against rotation on the shaft 6. The selector means 26 may be mechanical or electro mechanical and may simply comprise a spring loaded arm having means to maintain it engaged or disengaged with the respective lever. An alternative form of selector means will be described in more detail hereinafter with reference to FIGURES 5 to 8.

An output gear 28 is locked to the shaft 6 by means of a grub screw 29 and drive is applied to the drive gear 11 of unit 2 by means of a worm gear 30, a collar 31 being provided between gear 11 of unit 2 and end plate 8.

Each of the speed change units illustrated in FIGURE 1 has a gear ratio numerically equal to its reference numeral. The drive gears 11 of the units are two part gears having a different number of teeth on each part. The number of teeth on the two part drive gears, and on the intermediate gears and output gear have, in this embodiment, been chosen so that the shafts 18 all lie on an axis parallel to the shaft 6.

Since all the drive gears and gear mounts are freely mounted on the shaft 6 and the intermediate gears are locked against rotation with respect to the mounts when the arms 27 are in the position shown in FIGURE 1, drive applied to drive gear 11 of unit 2 by the worm gear 30 causes the gear mounts to rotate about the shaft 6, the intermediate gear 13 of the last unit 5 in the series driving the output gear 28 to rotate the shaft 6.

If now the selector means 26 associated with, say, unit 3 is operated, its arm 27 engages the upper nose portion 21 of the lever 20 to free the intermediate gears 12 and 13 for rotation in the gear mount 10 and lock the latter against rotation on the shaft 6. Thus drive is now transmitted from drive gear 11 of unit 3 through the intermediate gears 12 and 13 to drive gear 11 of unit 4 introducing a speed change of 3:1. The output shaft will now rotate at one-third its previous speed. Whilst the selector means 26 associated with the unit 3 is in its operated condition one or more of the selector means associated with the other units 5, 4 and 2 may be operated to provide a further speed reduction of the output shaft. Since the drive is transmitted serially through the units, if, say, selector means 26 associated with unit 5 is also operated, then a speed reduction of 15:1 will be obtained.

Reversal of the direction of rotation of the shaft 6 may be obtained by including an idler gear between the drive gear of one unit and intermediate gear of the same or next unit.

An alternative form of gear selection for a single speed change unit is illustrated in FIGURES 5 to 8 which show a cross-section view of a mount similar to the mounts 10 incorporated in the speed change units 2, 3, 4 and 5 shown in FIGURE 1 but modified to provide an annular groove aligned with the slot providing the cheeks 14 and 15. The modified mount bears the reference numeral 40 and the annular groove the reference numeral 41. Parts shown in FIGURES 5 to 8 which are the same as those shown in FIGURES 1 to 4 bear the same reference numerals. It will be understood that a variable ratio gear mechanism may be constructed using the mounts and selection mechanism shown in FIGURES 5 to 8 for all the speed change units 2, 3, 4 and 5 shown in FIGURE 1.

Referring now to FIGURES 5 to 8 there is shown a mount 40 freely mounted on the shaft 6 and encompassed by a frame 43 having a recess 44 in the top portion thereof immediately over the mount 40. An arm 45 is pivotally connected to the frame 43 by a pivot pin 46 and includes a portion 47 depending into the recess 44 and having an arcuate face 48 disposed in parallel relationship with the periphery of mount 40 when the arm 45 is in its normal position as shown in FIGURE 5. The portion 47 is of a thickness such as to allow entry thereof into the slot when the arm 45 is pivoted about the pivot pin 46. The pin 16 connecting shafts 17 and 18 of the intermediate gears 12 and 13 (shown in FIGURE 3) is referenced 16' in FIGURE 5 and is engaged by an abutment 49 depending from a pawl 50 which is disposed within the slot formed by the cheeks 14 and 15 shown in FIGURE 3 and pivoted thereto by means of a pivot pin 51 to prevent rotation of the intermediate gears. The pawl 50 which functions in a similar manner to the lever 20 shown in FIGURES 2 and 4 has an arcuate portion which is aligned with the periphery of the mount 40 when the arm 45 is in the position shown in FIGURE 5.

To select a speed change unit, the arm 45 is raised whereby a heel 52 of the arm portion 47 enters the slot in the mount 10 and engages the outer arcuate periphery of pawl 50 pivoting it about its pivot pin 51 thereby disengaging the abutment 49 from the pin 16' as illustrated in FIGURE 6.

Figure 7:
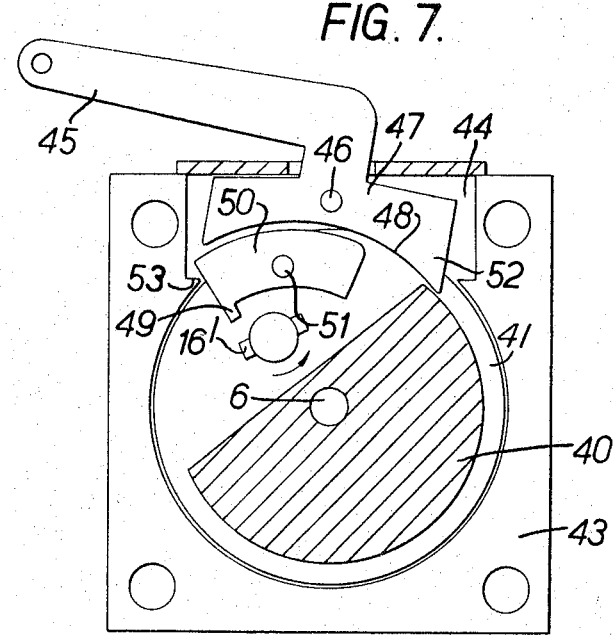
Figure 8:
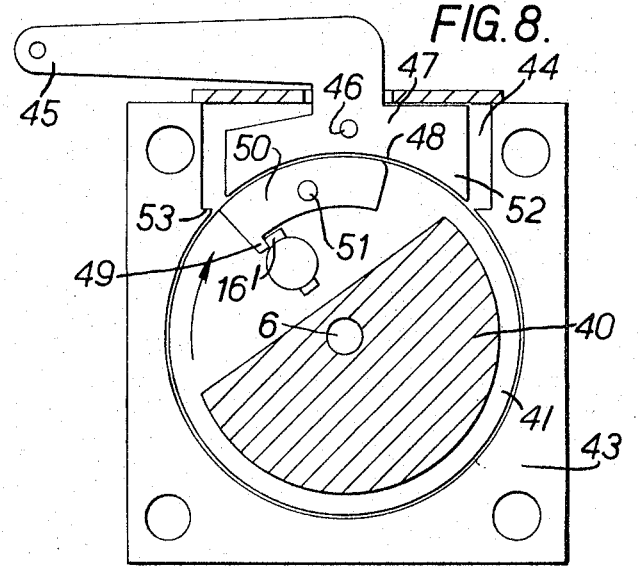

The intermediate gears 12 and 13 now being free to rotate to provide a reduction drive between the gears 11 mounted on shaft 6 each side of the mount as described with reference to FIGURES 1 to 4. When the intermediate gears rotate the mount rotates in a direction opposite to the direction of rotation thereof when the intermediate gears are held against rotation, but this counter rotation is arrested by a stop formed by shoulder 53 of the recess 44 as shown in FIGURE 7. Thus the mount is prevented from rotating and drive is provided through the speed reduction gearing comprising the intermediate gears 12 and 13 and the meshing gears 11.

To disengage the selected speed change unit, the arm 45 is returned to its original position as shown in FIGURES 5 to 8 whereby the pawl 50 is pivoted to a position in which its outer arcuate periphery is aligned with the periphery of the mount 10 clearing the shoulder 53 and preventing rotation of the intermediate gears by the abutment 49 moving into a position to engage the pin 16'.

Thus it will be seen that by providing four speed change units only, sixteen different speed ratios may be obtained. Furthermore the mechanism is relatively simple to manufacture since by proper selection of gear ratios and the gears employed, each gear mount can, as in the embodiment described, be made the same. Also as the drive gears and mounts are rotatable on the common shaft, assembly is simplified as it is only necessary to slip on each drive gear and mount followed by the output gear to maintain the units on the shaft.

I claim:

1. A variable ratio gear mechanism comprising a common shaft and a plurality of speed change units mounted in series thereon, each unit comprising a drive gear rotatable on said shaft, a disc-shaped gear mount also rotatable on said shaft and having a circumferential slot forming two opposing cheek portions, two stub shafts each rotatably mounted in a different one of said cheek portions in coaxial alignment one with the other, an end portion of one of said shafts being received within the opposing end portion of the other of said shafts, a pin passing through the end portions of said shafts and rotatable therewith in the slot between said cheek portions, two intermediate gears each secured to a different one of said stub shafts and coupling the drive gear of the unit with the drive gear of the next unit in the series, a member pivotally connected to said mount within said slot and engageable with said pin to prevent rotation of said intermediate gears, selector means engageable with said member to disengage it from said pin to release the intermediate gears for rotation and restrain rotation of the mount, an output gear mounted on the shaft and coupled to an intermediate gear of the last of said units in the series and means to supply drive to the drive gear of the first unit in the series.

2. A variable ratio gear mechanism according to claim 1 in which said mount has a bore therein opening out into said slot, and a spring received in said bore urging said member into engagement with said pin; said member having a nose portion extending in a radial direction away from said common shaft and said selector means includes an arm having a cut-away portion engageable with said nose portion upon actuation of said selector means to disengage said member from said pin and lock the mount against rotation.

3. A variable ratio gear mechanism according to claim 2 in which both said stub shafts are hollow and said unit includes a grub screw received within the hollow portion of one of said stub shafts to lock the latter to the pin.

4. A variable ratio gear mechanism according to claim 1 including a plurality of frame members each encompassing a different one of said mounts and in which said selector means comprises a plurality of levers each pivoted in a different one of said frame members and actuable to move the associated member to disengage it from said pin and simultaneously to lock the mount against rotation.

References Cited by the Examiner

UNITED STATES PATENTS

| | | | |
|---|---|---|---|
| 799,805 | 9/1905 | Simonds | 74—770 |
| 1,707,393 | 4/1929 | Gherassimoff | 74—773 |
| 2,691,904 | 10/1954 | Silvander | 74—789 |

DAVID J. WILLIAMOWSKY, *Primary Examiner.*

H. S. LAYTON, *Assistant Examiner.*